(12) United States Patent
Panek et al.

(10) Patent No.: US 9,471,857 B2
(45) Date of Patent: Oct. 18, 2016

(54) OVERCOAT PROCESSING MECHANISM

(71) Applicants: Alexandru-Virgil Panek, Ghiroda (RO); John Thomas Varga, Longmont, CO (US)

(72) Inventors: Alexandru-Virgil Panek, Ghiroda (RO); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/564,687

(22) Filed: Dec. 9, 2014

(65) Prior Publication Data

US 2015/0161489 A1 Jun. 11, 2015

Related U.S. Application Data

(63) Continuation of application No. 13/780,201, filed on Feb. 28, 2013, now Pat. No. 8,934,144.

(51) Int. Cl.
*H04N 1/40* (2006.01)
*G06K 15/02* (2006.01)
*B41J 2/21* (2006.01)

(52) U.S. Cl.
CPC .......... *G06K 15/1868* (2013.01); *B41J 2/2114* (2013.01); *G06K 15/186* (2013.01); *G06K 15/1889* (2013.01)

(58) Field of Classification Search
CPC ...... H04N 1/54; H04N 9/045; H04N 1/6027; H04N 13/0422; C09D 11/101; C09D 11/40; G03F 7/007
USPC .............. 358/3.24–3.26, 3.28, 2.1, 1.9, 3.06, 358/3.09, 468
See application file for complete search history.

(56) References Cited

U.S. PATENT DOCUMENTS

| 8,934,144 B2 * | 1/2015 | Panek et al. ................. 358/3.24 |
| 2009/0207429 A1 | 8/2009 | Iguchi |
| 2010/0231976 A1 | 9/2010 | Nakano |
| 2011/0128585 A1 | 6/2011 | Romney |
| 2012/0063802 A1 | 3/2012 | Suzuki et al. |
| 2012/0105915 A1 | 5/2012 | Kobayashi et al. |
| 2012/0162720 A1 | 6/2012 | Hayashi |

* cited by examiner

*Primary Examiner* — Thomas D Lee
*Assistant Examiner* — Stephen Brinich
(74) *Attorney, Agent, or Firm* — Blakely, Sokoloff, Taylor & Zafman LLP (57) ABSTRACT

A method is disclosed. The method includes analyzing color planes of a compressed sheetside image and generating an overcoat plane based on the color planes.

14 Claims, 6 Drawing Sheets

OVERCOAT PROCESSING MECHANISM

The present patent application is a Continuation application claiming priority from application Ser. No. 13/780,201, filed Feb. 28, 2013 which is currently pending.

FIELD OF THE INVENTION

This invention relates generally to the field of printing systems. More particularly, the invention relates to image processing.

BACKGROUND

In a variety of document presentation systems such as printing systems, it is common to rasterize data to generate a bitmap representation of each sheetside image of the document by processing a sequence of data objects. The data objects are typically initially defined in a page description language or other suitable encoding and at some point prior to writing to a bitmap are represented as regions of rectangles of pixels. Typically, the sheetside image is then generated into a bitmap memory as a two dimensional matrix of pixels representing the intended document sheetside image, and subsequently compressed.

During sheetside processing, a calculation may be performed to determine an amount of overcoat ink to be provided on a page. Overcoat ink is used, for example, to protect ink from water and to provide a glossy finish. Such uses allow an overcoat ink plane to be generated from existing print data without requiring a user to generate additional data.

Overcoat planes are sometimes imaged at reduced resolutions, reduced bit depth, and at different intensities. Thus, the amount of overcoat ink needed is based on the amount of ink that needs overcoat. For example, 1200 dpi bitmaps of cyan, magenta, yellow and black (CMYK) data (e.g., 4 planes) currently require over 134 million algorithm calculations for data in an 8.5 by 11 inch page in order to determine overcoat amounts. Moreover, an additional four calculations must be averaged to determine a reduced resolution overcoat amount.

Accordingly, an efficient overcoat processing mechanism is desired.

SUMMARY

In one embodiment, a method is disclosed. The method includes analyzing color planes of a compressed sheetside image and generating an overcoat plane based on the color planes.

BRIEF DESCRIPTION OF THE DRAWINGS

A better understanding of the present invention can be obtained from the following detailed description in conjunction with the following drawings, in which.

DETAILED DESCRIPTION

An efficient overcoat processing mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
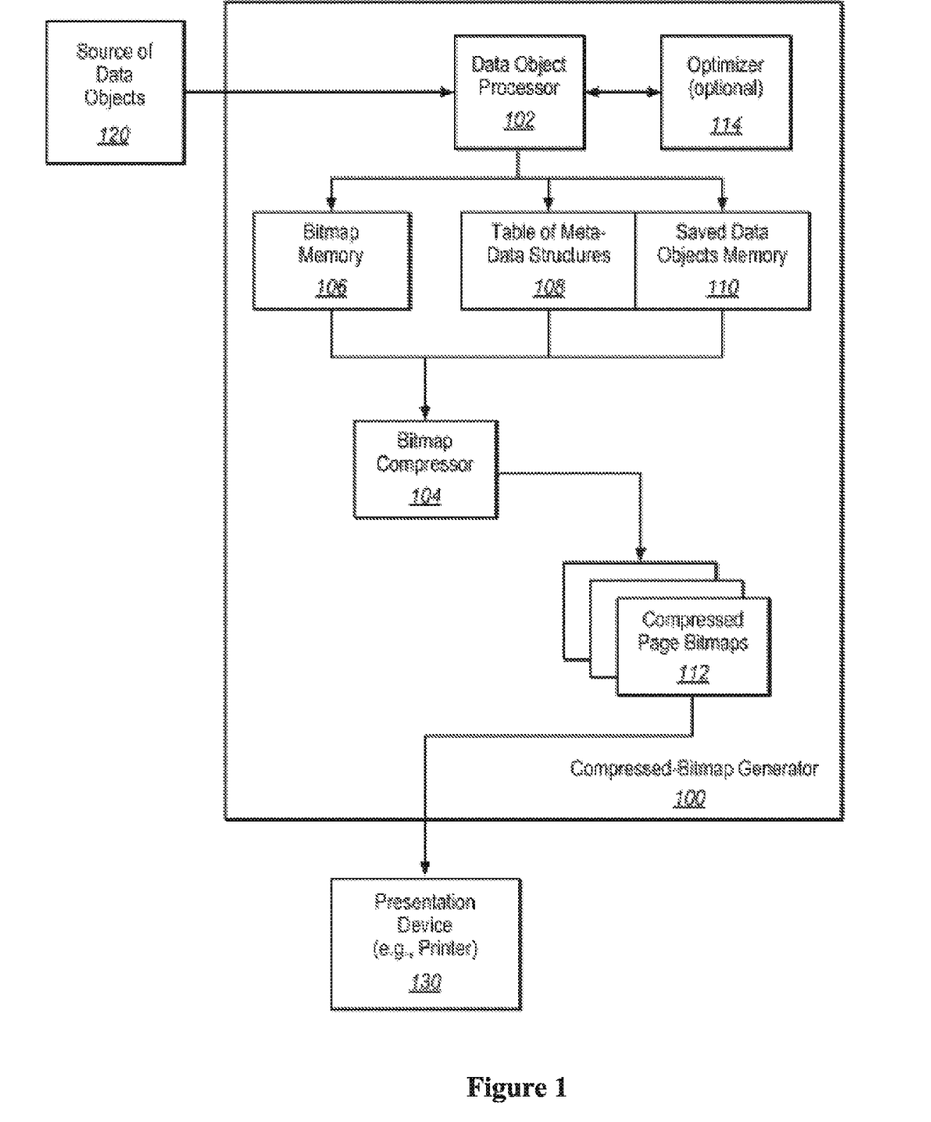
FIG. 1 is a block diagram illustrating one embodiment of a system that processes data objects to generate compressed bitmaps utilizing meta-data structures.

FIG. 1 is a block diagram of a system 100 for generating compressed bitmaps. A source of data objects 120 provides a sequence of data objects that represent a sheetside image. Data object processor 102 processes the sequence of data objects to generate a sheetside image represented in bitmap memory 106 and/or in a table of meta-data structures 108. Each sheetside image causes generation of a compressed page bitmap 112 by operation of the bitmap compressor 104.

Such a sequence of compressed page bitmaps 112 may represent a stored document or job to be transmitted to a presentation device 130. Presentation device 130 may be, for example, a printer and thus the sequence of compressed page bitmaps 112 may represent a print job or document to be printed by a printer.

Data object processor 102 processes the data objects representing information to be presented on a sheetside image. The data objects as received may be encoded in any of several well-known encoding standards such as page description languages and other document description standards. A data object may represent, for example, text or graphical information to be positioned within the sheetside image of the document. Thus, data object processor 102 is generally operable to process the data object by storing information derived from the data object in the bitmap memory 106 and/or in associated meta-data structures 108.

In one embodiment, data object processor 102 utilizes a table of meta-data structures 108 to reduce the need to write bitmap memory 106 for each data object and thus reduce utilization of memory bandwidth between data object processor 102 and bitmap memory 106. Reduced utilization of bitmap memory bandwidth improves efficiency of the generation of the corresponding compressed bitmaps by speeding the generation of the uncompressed sheetside image.

Specifically, data object processor 102 stores information relating to portions of bitmap memory 106 in corresponding entries of meta-data structure table 108. Processing of many data objects affecting portions of the bitmap memory 106 may be completed by simply updating information in corresponding entries of meta-data structure table 108. Other, or subsequent, data objects may require that the bitmap memory 106 be written in accordance with data represented by the data object.

Data object processor 102 therefore determines in processing each data object for the sheetside image whether portions of the data object must be written to portions of bitmap memory 106 or whether they may be compactly represented in corresponding meta-data structures within the table of meta-data structures 108 without requiring writing of portions of bitmap memory 106.

In one embodiment, a significant number of data objects may be represented by compact meta-data structures in table 108 and thus processor 102 may avoid the necessity of writing pixel by pixel information into bitmap memory 106. Some simple data objects such as those representing a solid color (e.g., a cleared bitmap or a solid color in a portion of the bitmap) may be represented in very compact form in meta-data structures of table 108 without requiring writing of any data in bitmap memory 106. Even more complex data objects such as a transparency masks or an opaque image may be represented compactly in a meta-data structure in table 108.

Processor 102 retains the received data objects in memory 110 and the meta-data structures may indirectly point to the saved data objects that are compactly represented thereby. Again with such a compact representation in the meta-data structure, data object processor 102 may reduce the volume of memory bandwidth utilization required to generate data objects.

Compressed-bitmap generator 100 also includes bitmap compressor 104 to generate compressed data representing a compressed page bitmap 112 following completion of the generation of a sheetside image by data object processor 102. When data object processor 102 has completed processing of a sequence of data objects representing a particular sheetside image, bitmap compressor 104 is operable to retrieve each meta-data structure and to generate compressed data in a compressed page bitmap 112 based on the information stored in the meta-data structure.

Where a meta-data structure provides sufficient information to generate a compressed representation of the corresponding portion of bitmap data, bitmap compressor 104 need not read bitmap memory 106 to generate a portion of the compressed page bitmap 112. Where the meta-data structure indicates that the corresponding portion of the bitmap contains the data to be compressed, bitmap compressor 104 reads the indicated portion of bitmap memory 106 to generate the corresponding portions of compressed page bitmaps 112.

Figure 2:
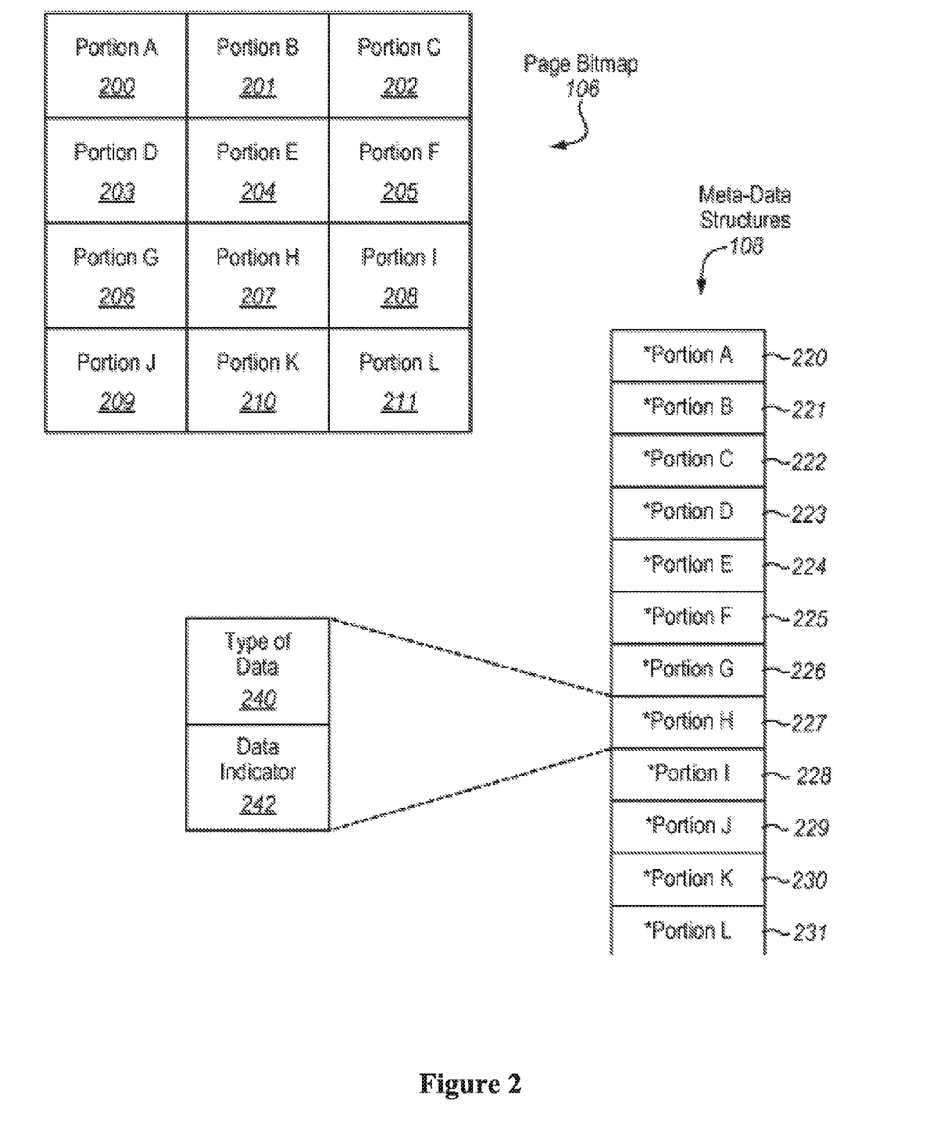
FIG. 2 is a block diagram illustrating one embodiment of a description of an association of each meta-data structure in a table of structures with a corresponding portion of the page bitmap memory.

FIG. 2 is a block diagram illustrating one embodiment of a relationship between a plurality of portions (or tiles) of a bitmap memory 106 and the table of meta-data structures 108. As shown in FIG. 2, bitmap memory 106 is logically subdivided into a plurality portions (or tiles) that may all be of equal size.

In one embodiment, bitmap 106 includes a plurality of identically sized, rectangular portions 200 through 211 ("Portion A" through "Portion L"). Each portion has a corresponding entry (220 through 231) in the table of meta-data structures 108. In particular, meta-data structure table 108 entry 220 ("*Portion A") includes information regarding the corresponding "Portion A" 200 of the bitmap memory 106. In like manner meta-data structure entry 221 ("*Portion B") corresponds to "Portion B" 201 of bitmap memory 106, etc.

Any suitable number of portions may be predefined in accordance with features and aspects hereof. Thus the number of such portions (200-211), the corresponding number of meta-data structures (221-231) in table 108, and the associated size of each of the portions may be predetermined and statically fixed within the system.

In one embodiment, each meta-data entry (220 through 231) includes a type of data field 240 and a data indicator field 242. The type of data field 240 indicates a type of data presently associated with the corresponding portion (200 through 211) of bitmap memory 106. Data indicator field 242 points (indirectly) at the saved data object that is presently associated with the portion corresponding to the meta-data structure. In a further embodiment, data indicator field 242 may directly encode the data of the data object presently associated with the portion.

Returning again to operation of data object processor 102 of FIG. 1, if the data derived from a data object were written to bitmap memory 106, the data may span one or more portions of the bitmap memory 106. As data object processor 102 processes data objects, for each portion of the bitmap memory 106 that would be affected by writing the data object, the corresponding meta-data structure in table 108 is updated to record information regarding the effect the data object would have on corresponding portions of the bitmap memory 106.

For example, if a data object would affect "Portion A" 200 and "Portion B" 201, data object processor 102 updates meta-data structures "*Portion A" 220 and "*Portion B" 221. Depending on the particular new data object and the current data compactly represented by the meta-data structure of a portion of the bitmap, updating the meta-data structures 220 and 221 may suffice to represent the new data object without needing to write data into the bitmap memory portions 200 and 201.

In one embodiment, the type of data field 240 of a meta-data structure entry may indicate that the corresponding portion of the bitmap memory is a "compact" type of data or a "non-compact" type of data. A data indicator field 242 represents the data of the corresponding portion in a compact form.

Most generally, if the data that would be in a portion of the bitmap memory may be compactly represented in the meta-data structure without requiring that the data be written to the corresponding portion of the bitmap memory, then the type of data for the affected meta-data structure is "compact" and the data indicator field represents the new data for the corresponding portion of the bitmap memory If the data that would be in a portion cannot be compactly represented in the meta-data structure, the type of data for the affected meta-data structure is "non-compact" and the data object/objects are simply written to the corresponding portion of the bitmap memory. Those of ordinary skill will recognize that these particular "type of data" values ("compact" and "non-compact") are intended mere as exemplary.

More specifically, a "compact" type of data indicates that the data of the corresponding portion of the bitmap is compactly represented by the information in the meta-data structure and hence is not written in the corresponding portion of the bitmap memory. For example, the bitmap memory at the start of processing of a sheetside image is logically cleared (e.g., a solid white background often represented as zeros in the bitmap memory).

As data objects are processed for the sheetside image, portions of the bitmap and corresponding meta-data structures may be affected by the processed data objects. A "compact" type of data in the meta-data structure for such an affected portion of the bitmap then indicates that some data object has been processed that has affected the corresponding portion of the bitmap and that the affect on the corresponding portion is represented compactly in the meta-data structure by the data indicator field.

For example, the data indicator field may indirectly point to the data object in the saved data object memory. In another example, the data indicator field may directly represent that data object by an encoded value (such as the color of a rectangular data object that affects the corresponding portion of the bitmap memory). Hence, the portion of the bitmap memory corresponding to a meta-data structure having the "compact" data type has no relevant information written therein thus reducing bitmap memory bandwidth utilization that would be required to write the data objects to the bitmap memory.

A "non-compact" type of data indicates that the data of the corresponding portion of the bitmap cannot be compactly represented in a meta-data structure alone for any of various reasons (i.e., cannot be adequately represented by the data indicator field). In such a case, the data object or objects that affect the corresponding portion of the bitmap memory are simply written to the bitmap memory.

Numerous conditions may arise to preclude a "compact" type of data representation for a portion of the bitmap. Other conditions may arise where, as a matter of design choice, the portion could be represented by either a "compact" type of data or by a "non-compact" type of data in the corresponding meta-data structure. Based on cost/benefit implementation details for a particular application it may be determined that a "compact" representation is not desired.

For example, added computational complexity to compactly represent combinations of data objects overlapping within a portion may be too high although the particular overlapping data could be represented compactly. In another example, if image objects are a rarity in a particular application, there may be little benefit in compactly representing image data objects in a "compact" type of data meta-data structure.

In yet another example, where image objects are frequent and often overlapping in portions of the bitmap memory (e.g., a photo montage), significant benefits may be realized in assuring that portions with such overlapping image objects are compactly represented whenever possible to avoid using bitmap memory bandwidth to write image data that is likely to be overwritten by a later image data object. These and other heuristics and design choices will be readily apparent enhancements to the features and aspects hereof to optimize the systems and methods for particular applications.

According to one embodiment, an optional optimizer element 114 may be operable in system 100 to analyze the efficiency of the number and size of the portions for a particular set of data objects. Based upon such analysis, optimizer 114 may adjust the size and number of such portions and correspondingly adjust the number of meta-data structures in table 108. For certain types of documents or jobs, fewer such portions of larger size may provide optimal results in processing sheetside images.

In other types of documents or jobs, a larger number of smaller portions may provide optimal sheetside image processing. Where the portions are all of equal shape and size, the association between a meta-data structure (220 through 231) and its corresponding portion (200 through 211) of the bitmap memory 106 may be determined by a simple indexing calculation to associate the meta-data structure by its index position within the table 108 with its corresponding bitmap memory portion. Where the number, size, and/or shape of the bitmap portions are variable, each meta-data structure (220 through 231) may include suitable addressing information to identify its corresponding portion (200 through 211) of the bitmap memory.

Figure 3:
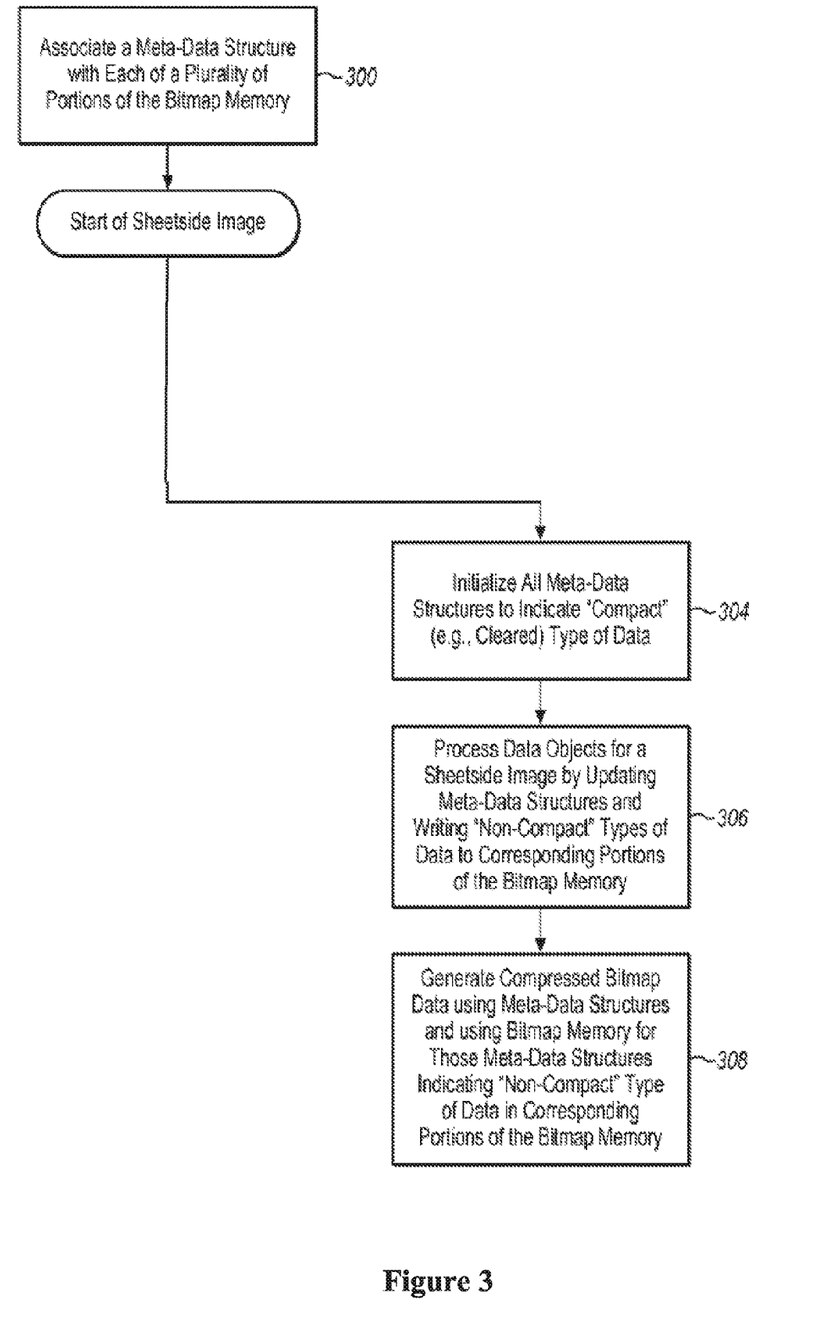
FIG. 3 is a flow diagram illustrating one embodiment of processing data objects representing a sheetside image utilizing meta-data structures.

FIG. 3 is a flow diagram illustrating one embodiment of processing data objects representing a sheetside image utilizing meta-data structures. Processing block 300 associates a meta-data structure with each of a plurality of portions of the bitmap memory. As noted above, the number of such portions, and hence the number of corresponding meta-data structures, may be statically predetermined or may be dynamically determined by optimization analysis in the processing of sheet side images. Processing block 300 therefore represents any suitable determination of an initial number of such portions and initialization of corresponding meta-data structures.

Prior to processing any data object, processing block 304 sets the type of data field of every meta-data structure to "compact" and the data indicator field is set to zero values (or other values representing a cleared state) to represent the cleared state of the bitmap memory at the start of generating a sheetside image (e.g., a "white" or "blank" sheetside image or a "cleared" sheetside image pre-set to a defined background color).

Processing of the sheetside image then continues to processing block 306 where the data object processor is operable to process the data objects corresponding to a sheetside image. The processing for each data object includes updating the meta-data structures for any corresponding portions of the bitmap that would be affected if data derived from the data object were to be written in the bitmap memory. The type of data field in each meta-data structure corresponding to an affected portion of the bitmap is updated to indicate the type of data now associated with the bitmap portion.

The data indicator field for each meta-data structure corresponding to an affected portion of the bitmap is also updated to represent the new data object that is associated with the corresponding portion of the bitmap. Exemplary details of the processing of processing block 306 for determining which portions of the bitmap memory may be affected by processing of the data object and associated processing to update corresponding meta-data structures are discussed further herein below. In general, the type of data field is updated to indicate changes in the corresponding affected portion of the bitmap from a "compact" type of data to a "non-compact" type of data.

Following completion of processing of the data objects for a sheetside image at processing block 306, processing block 308 represents processing of the bitmap compressor of system 100 to generate a compressed bitmap data representation of the sheetside image. The bitmap compressor uses each meta-data structure to determine from the type of data field whether the compressed data may be generated exclusively from the information in the meta-data structure (e.g., for "compact" types of data) or whether the compressed data must be generated by reading the data stored in the corresponding portion of the bitmap memory (e.g., for "non-compact" type of data). Thus, processing of the bitmap compressor in processing block 308 further reduces bitmap memory bandwidth utilization by avoiding the need to read bitmap memory for portions containing non-"non-compact" types of data.

Rather, for such "compact" types of data, the meta-data structure alone provides sufficient information for the bitmap compressor to generate compressed data representing the corresponding portion of the bitmap. Completion of the processing of processing blocks 304 through 308 thus generates a compressed bitmap representation of a sheetside image with reduced utilization of the bitmap memory bandwidth.

Figure 4:
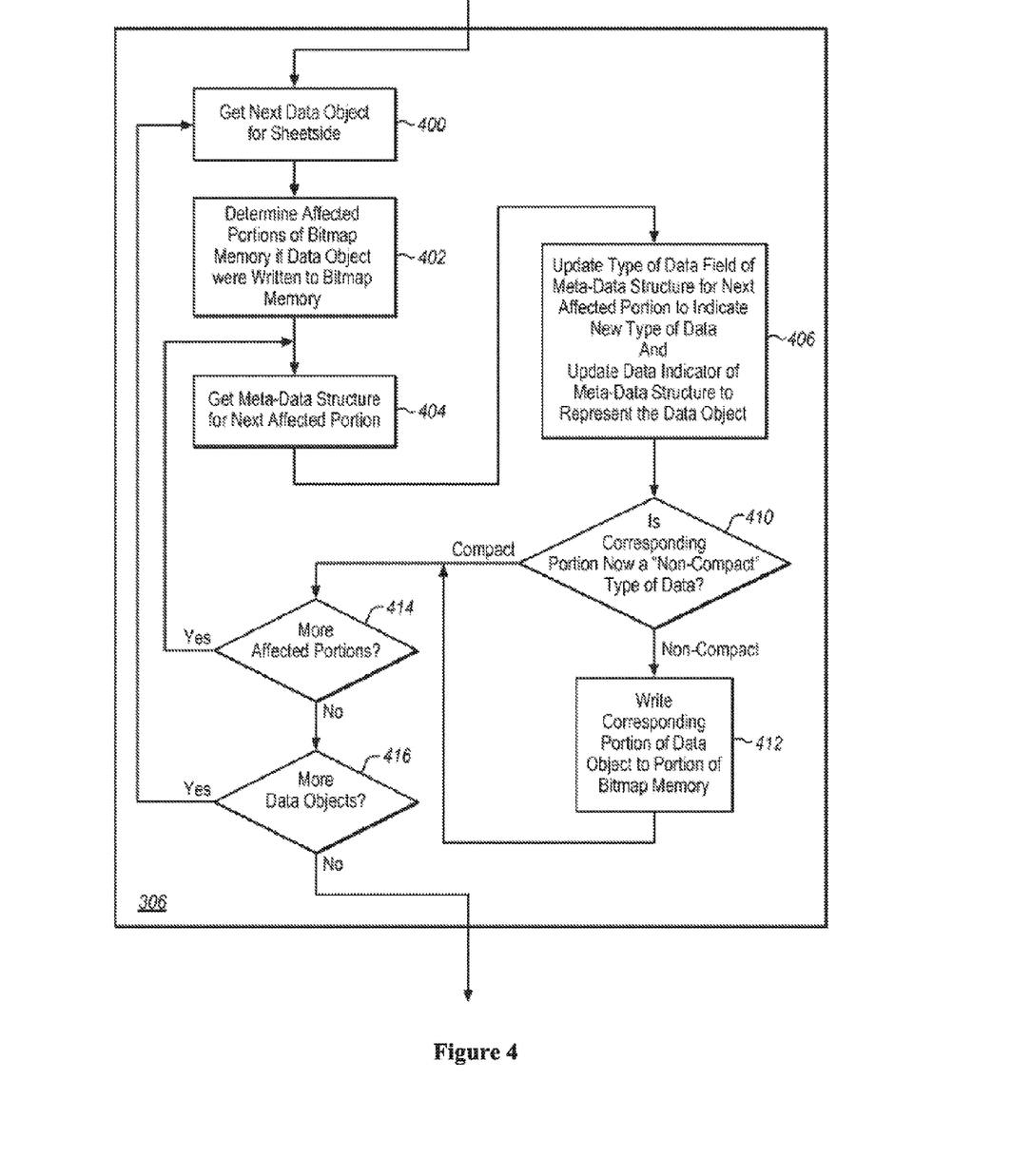
FIG. 4 is a flow diagram illustrating one embodiment of processing data objects for a sheetside.

FIG. 4 is a flow diagram illustrating one embodiment of processing data objects for a sheetside. Processing block 400 gets the next (or first) data object for the sheetside image to be generated. Processing block 402 then determines which portions of the bitmap memory would be affected by the data object if the data object were written to the bitmap memory by standard bitmap processing techniques. The portions affected may be determined by comparing geometric parameters of the object (e.g., bounding box dimensions and position of the object on the bitmap) with the dimensions of the various portions. For each portion of the bitmap that would be affected by the data object, processing blocks 404 through 414 are repeated.

Processing block 404 gets the next (first) meta-data structure corresponding to a next affected portion of the bitmap. Processing block 406 then updates the type of data field of the meta-data structure to indicate any change to the field in accordance with the particular data object. In addition, processing block 406 updates the data indicator of the meta-data structure to represent the data object being processed if the object is to be compactly represented in the meta-data structure.

Exemplary additional details of processing block 406 are discussed further herein below. In general, the data type field of the meta-data structure is updated to indicate "compact" if the affect of the data object on the corresponding portion of the bitmap memory will be compactly represented by the meta-data structure fields (in combination with the saved data object represented by the data indicator field).

If the effect on the portion will not be compactly represented by the meta-data structure, the type of data field is updated to indicate a "non-compact" type of data and the affect of the data object is actually written to the corresponding portion of the bitmap (processing block 412 below). For example, overlaying certain data objects by other data objects may not be compactly represented (in some cases) and hence the data object is simply written to the corresponding affected portion of the bitmap memory. However, before the data object is written into the corresponding affected portion of the bitmap memory, if there are previous objects that are to remain visible in that portion, the compact data is first written into the portion to initialize the memory to the prior object(s).

Alternatively, as a matter of design choice certain objects or combinations of objects may be written to the bitmap for optimization consideration in a particular application. In other embodiments, portions or edges of a data object may cover only part of a portion of the bitmap. Again, as a matter of design choice such partial coverage of a portion by an object may or may not be represented by the corresponding meta-data structure.

These and other heuristic decisions may be employed within the processing of processing block 406 to determine in what conditions the affected portion can be and will be represented compactly by the meta-data structure. Thus in processing block 406, a determination is made as to whether it is possible to compactly represent the affected portion and whether it is desirable to do so in a particular application.

Processing block 410 determines whether the meta-data structure type of data field has been updated to indicate a "non-compact" type of data. If so, processing block 412 writes the corresponding portion of the bitmap memory with the rasterized data derived from the data object. In either case, processing continues at processing block 414 to determine whether additional affected portions remain to be processed.

If so, processing continues looping back to processing block 404 to process meta-data structures corresponding to other affected portions and processing of this data object. If not, processing block 416 next determines whether additional data objects remain to be processed for this sheetside image. If so, processing continues looping back to processing block 400 to retrieve and process a next data object for the current sheetside image. Otherwise processing of this sheetside image is completed.

In one embodiment, updating the meta-data structure, as referred to in processing block 406 comprises determining whether the affected portion will be compactly represented by the corresponding meta-data structure. As noted above, this determination may entail determining not only whether the affected portion can be represented compactly but also determining whether it is desirable to do so based on design choices in the implementation of features and aspects hereof.

For example, it may be possible to compactly represent a portion of a bitmap even if the data object affects only part of the portion of the bitmap. Additionally, it may be possible to compactly represent a portion of a bitmap even if multiple objects overlay one another in particular ways within the affected portion.

If the new object cannot be compactly represented by the meta-data structure, it is next determined whether the meta-data structure presently indicates that the corresponding portion is already written with data from one or more prior objects (e.g., already indicates a "non-compact" type of data in the meta-data structure). If so, processing is complete. Otherwise the type of data is changed to "non-compact" and all previously represented data objects to the affected portion of the bitmap is written Specifically, the data that is represented by the present meta-data structure is written to the corresponding portion of the bitmap memory. In other words, the currently represented "compact" type of data object/objects represented in the meta-data structure is/are written to the corresponding portion of the bitmap memory.

Since these previously processed objects have not yet been written to the bitmap, they must be written to the affected portion before the data derived from the new data object is written in the affected portion. Subsequently, the type of data is set to "non-compact" to complete processing of this meta-data structure and corresponding bitmap portion affected by the new data object.

If it is determined that the present meta-data structure indicates that the new object can be compactly represented by the meta-data structure (and if it is determined to be desirable as a matter of design choice), it is next determined whether the new object will affect a change of the affected portion. For example, if the meta-data structure indicates a "compact" type of data that indicates a solid color is represented and if the new data object does not change that color (e.g., because it is the same color or transparent), then the new object would not change the portion and processing is complete.

If it is determined that the data object changes the meta-data representation of the corresponding portion, the type of data field is updated (or set) to indicate a "compact" type of data and the data indicator field is set to represent the new data object (e.g., indirectly point to the saved data object or otherwise directly encode the data object in the data indicator field). Processing of this meta-data structure corresponding to an affected portion of the bitmap is then complete.

In one embodiment, an effect a data object may have on one or more portions of the bitmap that it overlays depends on the particular semantic of the data object. Any of a variety of data objects may be encountered depending upon design choices in implementation of features and aspects hereof. In general all objects may be considered as a collection of pixels—each pixel having some value indicating a color and/or indicating a transparency value.

In general, all objects are represented as a 2-dimensional array of such pixel values (e.g., a rectangular bounding box of pixel values). The value of a pixel may be encoded in a number of manners. For example, full color data objects may be defined as a pixel intensity value for each of three primary color planes and the color black. In another example, each pixel may simply encode an index value into a table of pre-defined colors (e.g., a palette). Further, each pixel value may encode a transparency level indicating that the pixel is transparent (i.e., has no color—no effect on the bitmap) or has some opaque color value (with the color specified by the value as indicated above).

Features and aspects hereof may be used with any and all such data object encodings and shapes. In one embodiment, data objects may be classified in one of four broad categories: rectangle, transparency mask, palette, and image with possible transparency and/or translucency.

A "rectangle" is any data object that represents a rectangular area where the pixels of the rectangular area each represent a specified opaque color. Thus, a rectangle object is typically defined by its geometric dimensions and a single color value. A rectangle may thus be compactly represented in a portion of the bitmap by a corresponding meta-data structure as a "compact" type of data where the data indicator field either points to the saved data object or encodes the dimensions and color of the rectangle.

A "transparency mask" is any data object (typically also rectangular in shape though not necessarily) where each pixel of the mask is either a "transparent" bit or an "opaque" bit of some specified color. This kind of data object is also sometimes referred to as a "bi-level image". Text is often represented as such a transparency mask. The glyph representing a character code or a sequence of such glyphs are represented as opaque pixels (all of the same color) against a bounding box background of transparent bits that do not affect the bitmap memory. When writing such a transparency mask to bitmap memory, the opaque pixels are written to the bitmap memory and the transparent pixels have no effect such that whatever was previously in the corresponding pixel locations of the bitmap memory remains unchanged. Typically the transparency mask is defined as a rectangular area with the transparent and opaque pixels defined therein. A transparency mask may thus be compactly represented in a portion of the bitmap by a corresponding meta-data structure as a "compact" type of data where the data indicator field points to the saved data object.

A "palette" is any data object that defines a shape (often a rectangular area) filled with one or more colors where the colors are selected from a limited set of colors (a palette). Thus, the colors are specified as index values in the relatively small range of palette values. In one embodiment of such a palette object, one palette color index value is reserved to represent a "transparent pixel" and all other palette color index values represent other corresponding colors in the palette. A palette data object may thus be compactly represented in a portion of the bitmap by a corresponding meta-data structure as a "compact" type of data where the data indicator field points to the saved data object.

An "image" data object is any object where each pixel has a pixel value in a color spectrum. Photographic images are exemplary of such an image object. An image is typically defined as a rectangular area of such pixel values. An image may thus be compactly represented in a portion of the bitmap by a corresponding meta-data structure as a "compact" type of data where the data indicator field points to the saved data object. Further, the pixels of an image object may be compressed and encoded according to a number of well known standards such as LZW and JPEG standards.

When data objects of these exemplary types are associated with portions by means of positioning the data object on a sheetside, the data object can be represented by a series of portions aligned with the portions of the underlying sheetside. Some affected portions of the bitmap memory are completely filled and some are only partially filled depending on the position of the data object on the sheetside. For example, a rectangle data object may include portions only partially affected by the data object at a boundary of the rectangle (i.e., showing the edges of the rectangle) and solid portions (i.e., the center areas, completely filled by the rectangle). Similarly, other types of objects (e.g., image data objects, transparency mask data objects, and palette data objects) may affect portions of the bitmap differently where the object completely fills a portion versus portions that are only partially affected by the data object at a boundary edge of the object. As noted above, such portions that are only partially affected by processing of a data object may nonetheless be compactly represented by the meta-data structure for that portion.

As data objects are processed to update meta-data structures corresponding to affected portions of the bitmap memory, combinations of data objects of the above types may be processed within any single affected portion (e.g., a sequence of objects may each affect a common portion each object overwriting or in some way adding to the pixels of the portion).

In one embodiment, the specific effect on a portion of the bitmap from processing a data object depends, in part, on the present type of data associated with the portion as indicated in the corresponding meta-data structure. In general, if an affected portion presently indicates a "compact" type of data in its corresponding meta-data structure, a next data object processed that completely fills the portion will typically retain the "compact" type of data but update the data indicator to represent the new object.

If the new object only partially covers the portion that is currently compactly represented by a corresponding meta-data structure, then the type of data may be changed to "non-compact" to represent the mixture of the effects of the prior data object mixed with the partial effect of the new data object.

If a "transparency mask" object is processed, its effect on any portion currently represented by a "compact" type of data meta-structure may depend on what the prior data object was. As can be seen from the above few examples, a variety of objects and combinations of objects may be represented compactly in the meta-data structure for an affected portion while other combinations of objects affecting a portion may require non-compact representation by writing to the bitmap memory portion.

As discussed above, bitmap compressor 104 generates a compressed representation of a sheetside image using the meta-data structures. In such an embodiment, the compressed data may be generated by stepping through each horizontal line across the bitmap memory (e.g., each scanline) and generating compressed data from the meta-data structures that intersect each scanline.

In a further embodiment, compressed data is generated according to a PackBits compression scheme (e.g., PackBits) for run-length encoding of the bitmap data. PackBits compresses raw data by looking for repeated strings having the same 8-bit value. A control byte is used to indicate repeat (negative values) or pass-thru (positive values) data. The absolute value of the control byte is the number of repeated or passed-thru values decremented by 1.

For instance, values 0 thru 127 indicate that 1 thru 128 passed-thru values will follow the control byte, while values −1 thru −127 indicate that the following value is repeated for a total of 2 thru 128 times. The value −128 is not defined, and thus may be used in non-standard ways. In one embodiment, 3 or more identical 8-bit data values are coded as a repeat sequence (e.g., 0 0 0 raw 8-bit data is coded as −2 0). Further, a string of non-identical data values is coded as a pass-thru (or literal) string (e.g., 21 22 23 24 raw data is coded as 3 21 22 23 24).

After a sheetside is compressed, the bitmap data is later processed for printing. Specifically, the data may be retrieved, decompressed and processed for printing. For instance, processing may involve converting the bitmap to a size commensurate with a printing bitmap. Also, additional bitmaps (e.g., N-up) or other data ((e.g., header/footer, watermark, etc.) may need to be added and/or overlaid.

In conventional processes, decompressing and re-compressing the data requires data in the PackBits format to be converted to image data, and subsequently back to the PackBits format. Such a process is inefficient in the use of memory, as well as in the time incurred for the PackBits decompression and compression.

According to one embodiment, retrieved PackBits data is left in that format and used in the generation of the subsequent sheetside generation, thus eliminating the compression and decompression times. In such an embodiment, a new object classification is introduced such that the broad categories now includes a PackBits object type, in addition to the rectangle, transparency mask, palette and image classifications discussed above.

In a further embodiment, a PackBits object location is saved as rectangle data, where the background color is solid and a PackBits "color" refers to a similar offset of PackBits data. Moreover, transparency (and possibly translucency) data may be stored with PackBits data to allow blending and bleed through, where transparent areas show only solid background color. Non-solid backgrounds (e.g., previous tile state) typically cause non-compact tiles if transparency is active or are not affected if the entire tile area is being overlaid with a completely transparent area.

Further, a tile having a PackBits object is processed according to the above-described mechanism such that a PackBits display item is found from a data indicator 242 pointer in the meta-data structure, and PackBits display items combined with other object types other than color create non-compact portions. Accordingly, the processing of tiles with PackBits objects is handled according to the "compact" and "non-compact" indications in the meta-data structures discussed above with reference to FIG. 4.

For example, when a PackBits object is retrieved for a sheetside image, a determination is made as to which portions of the bitmap memory affected by the PackBits object, a corresponding meta-data structure to a next affected portion of the bitmap is retrieved, the type of data field of the meta-data structure is updated to indicate a change to the field and to represent the data object being processed if the object is to be compactly represented in the meta-data structure. Thus, the effect of PackBits object processing is that data is pulled from referenced PackBits data upon encountering a PackBits tile during a subsequent bitmap processing and prior to recompression for printing.

Subsequently, the sheetside image is compressed according to processing block 308 discussed above with reference to FIG. 3. However, during compression of the sheetside image, data from PackBits objects may be simply realigned and inserted into the corresponding bitmap without compression since the objects are already in a compressed format. For instance, tiles exclusively including PackBits objects are inserted into the bitmap without decompression or further compression, while tiles mixed with PackBits objects and other objects may require additional decompression and recompression.

Overcoat Processing

As discussed above, overcoat (OC) plane processing may be performed to determine an amount of OC ink to be provided on a page. According to one embodiment, the number of processing calculations for overcoat processing are reduced by using values derived from the compressed CMYK output discussed above. In such an embodiment, PackBits runs are implemented to determine each CMYK overcoat plane without decompressing the data or processing a separate uncompressed overcoat plane.

In one embodiment, the compressed data in each plane includes identical runs of data or individual pixel values. Thus, while viewing the four planes, a metadata mapping is created that describes runs of an identical color (e.g., an identical run in each plane) or individual CMYK colors. A single processing calculation is used to find the overcoat value over the course of a run. Accordingly, a compressed bitmap can be used to derive the overcoat PACKBITS bitmap directly.

In one embodiment, OC settings are read from a sidesheet structure, and various working variables are initialized according to the requested OC resolution and other parameter values, when the compressor is initialized. In such an embodiment, a lookup table corresponding to a specific OC function and its parameter values is accessed.

In a further embodiment, the OC plane is seen as a tiled meta-image (e.g., with tiles of the same size (or reduced size) as the CMYK planes, with the tiles being processed in rows, from the top to the bottom of the plane). Each row of tiles may have a corresponding number of OC scanlines, with the last row potentially having fewer scanlines. Moreover, all of the scans in such a row have the same structure (e.g., parts known to have a specific OC value and parts that need to be calculated on the fly).

According to one embodiment, OC tile types are considered either solid or non-compact, in which all of the OC pels in the area corresponding to a solid tile have the same known value, while values corresponding to non-compact tiles are calculated from their CMYK counterparts. A solid OC tile corresponds to a tuple of solid C, M, Y and K tiles, and non-compact OC tiles correspond to all the other combinations of CMYK tiles. Accordingly, the first stage of OC compression rasterizes all the CMYK pels corresponding to non-compact OC tiles on a plane-by-plane basis.

In one embodiment, one row of OC tiles are processed per iteration. For each row the OC tiles in the row are determined from their CMYK counterparts, and based on these types and the left/right tractor margins the structure of an OC scanline is determined. In one embodiment, a segment buffer is used such that each segment is described by two 32-bit integers, where the first segment specifies the segment length in OC pels and its type (e.g., pre-calculated or calculated using a specific OC type) and the second segment specifies either the pre-calculated OC value or the offset relative to the beginning of the OC scanline. Subsequently, a segments list is processed for each of the OC scanlines corresponding to the current row.

Figure 5:
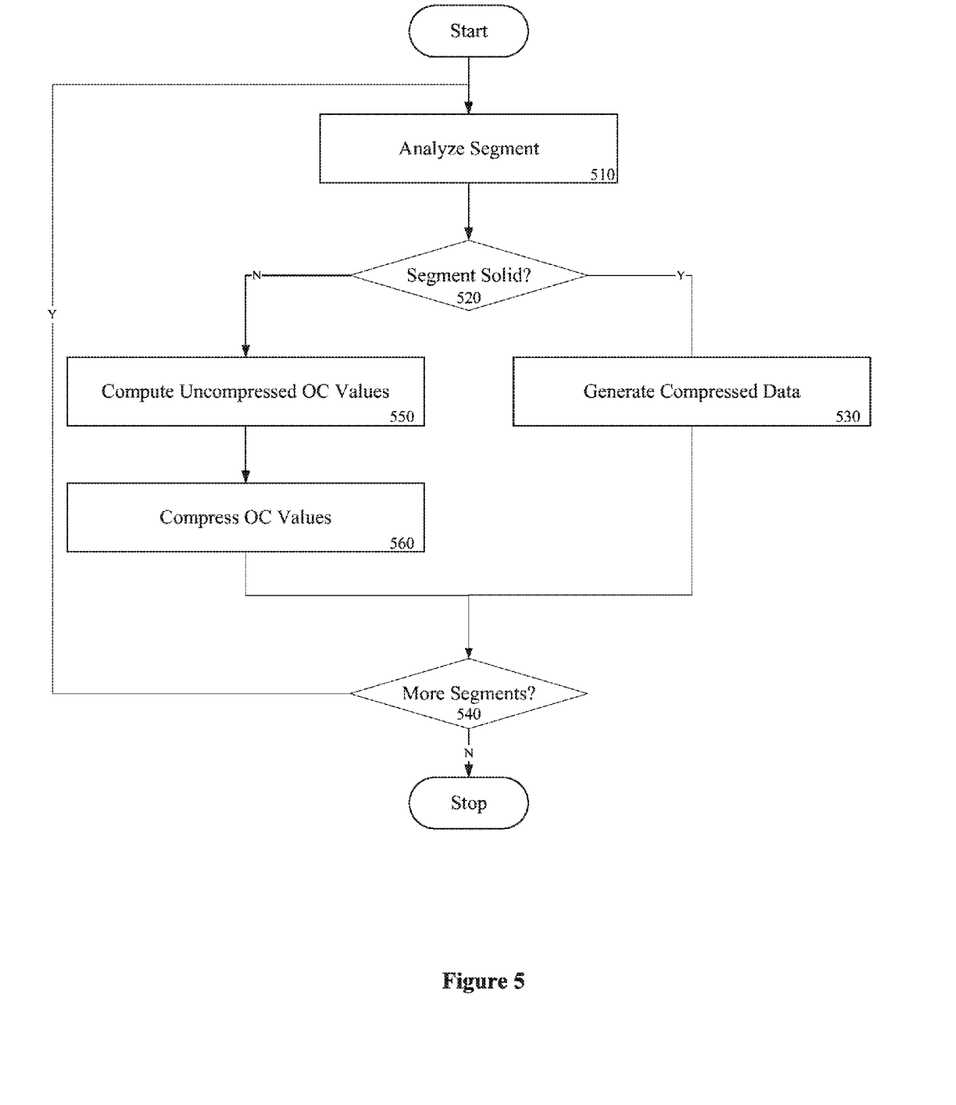
FIG. 5 is a flow diagram illustrating one embodiment of performing overcoat processing.

FIG. 5 is a flow diagram illustrating one embodiment of performing overcoat processing. At processing block 510, a segment in the segment list is analyzed. At decision block 520, a determination is made as to whether the segment is a solid segment. If so, both the segment length and OC value are known, and compressed data for the segment is directly generated, processing block 530.

Subsequently, there is a determination as to whether there are additional segments to process, decision block 540. If there are more segments to process, control is returned to processing block 510 where the next segment is processed. Otherwise the process has completed. If at decision block 520, a determination is made that the segment type is solid, the uncompressed OC values for the segment is computed, processing block 550.

In one embodiment, the OC values for the segment are computed using the four corresponding segments of the C, M, Y and K planes. In a further embodiment, an averaging of the C, M, Y, K values of the input pel(s) corresponding to an output OC pel is performed for the OC calculation. Subsequently, a look-up in a pre-calculated (look-up) table is performed to obtain an OC value for the average.

At processing block 560, the overcoat values are compressed. According to one embodiment, the values are compressed using information from the meta-data structures to infer OC pel values on the fly from the CMYK color planes with minimum additional memory. Additionally, multiple OC function types may be implemented such that the same CMYK inputs can be mapped to different OC outputs. Further, different OC functions may be used for vertical partitions of the output image (e.g., the margins/tractor strips may use another OC function than the user area), and the OC output can be generated at the same resolution as the CMYK input or at a reduced resolution (e.g., ½ on both axes).

In one embodiment, these function types denote different ways of obtaining the overcoat values depending on the CMYK values. For example, a trivial case may include a constant function generating 30% or 50% overcoat values regardless of the CMYK pel values. Another example is a function that actually uses the CMYK pel values to determine an average ink value prior to selecting an OC value proportional to that average. Yet another function will distinguish between tractor strips (e.g., the left and right parts of a sidemap of configurable width) and the remainder of the page.

Once the computed OC values are compressed, there is again a determination, at decision block 540, as to whether there are additional segments to process. If so, control is returned to processing block 510 where the next segment is processed. Otherwise, the process has completed.

Although described with reference to PackBits, one skilled in the art will appreciate the above-described mechanisms may be implemented using other compression formats (e.g., Run ends).

Figure 6:
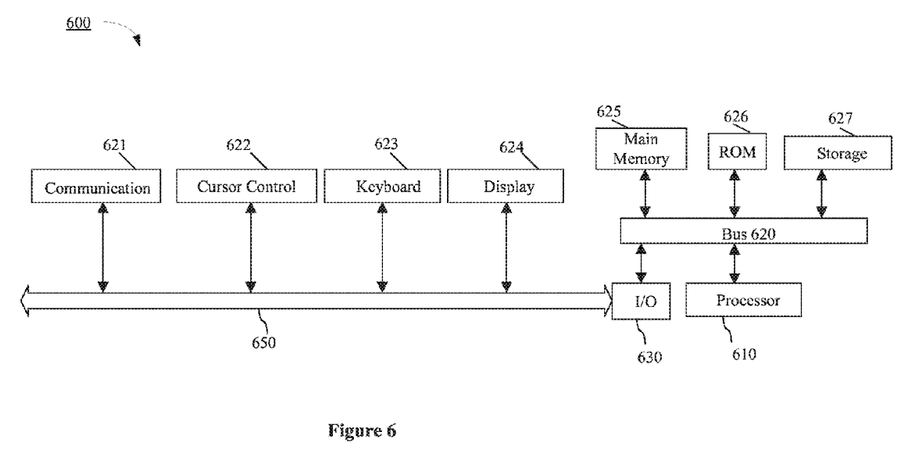
FIG. 6 illustrates one embodiment of a computer system.

FIG. 6 illustrates a computer system 600 on which compressed bitmap generator 100 and/or decompressors 125 may be implemented. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of wired or wireless networks.

Embodiments of the invention may include various processing blocks as set forth above. The processing blocks may be embodied in machine-executable instructions. The instructions can be used to cause a general-purpose or special-purpose processor to perform certain processing blocks. Alternatively, these processing blocks may be performed by specific hardware components that contain hard-wired logic for performing the processing blocks, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer generated method comprising:
using a processor to receive a compressed bitmap sheetside image;
using the processor to process the compressed bitmap sheetside image, including:

analyzing color planes of a compressed bitmap sheetside image, including analyzing a segment list to determine if a first segment in the list is a solid segment; and generating an overcoat plane based on the color planes.

2. The method of claim 1 further comprising:

the processor computing uncompressed overcoat values if the first segment is not a solid segment; and the processor compressing the overcoat values.

3. The method of claim 2 wherein the overcoat values are computed by:

the processor averaging of the C, M, Y, K values of the input pel(s) corresponding to an output; and the processor retrieving a value from a lookup table using the average values.

4. The method of claim 2 further comprising the processor generating compressed data for the segment if the segment is solid.

5. The method of claim 4 further comprising the processor determining if a second segment is available in the second list to be analyzed.

6. A system comprising a processor to receive a compressed bitmap sheetside image and process the compressed bitmap sheetside image, including:

analyzing color planes of a compressed bitmap sheetside image, including analyzing a segment list to determine if a first segment in the list is a solid segment; and generating an overcoat plane based on the color planes.

7. The system of claim 6 wherein the processor computes uncompressed overcoat values if the first segment is not a solid segment and compresses the overcoat values.

8. The system of claim 7 wherein the overcoat values are computed by averaging of the C, M, Y, K values of the input pel(s) corresponding to an output and retrieving a value from a lookup table using the average values.

9. The system of claim 7 wherein the processor further generates compressed data for the segment if the segment is solid.

10. The system of claim 9 wherein the processor further determines if a second segment is available in the second list to be analyzed.

11. An article of manufacture comprising a computer-readable medium including instructions, which when executed by a processor performs:

a processor receiving a compressed bitmap sheetside image;

the processor processing the compressed bitmap sheetside image, including:

analyzing color planes of a compressed bitmap sheetside image, including analyzing a segment list to determine if a first segment in the list is a solid segment; and generating an overcoat plane based on the color planes.

12. The article of manufacture of claim 11 comprising a computer-readable medium including instructions, which when executed by the processor further performs:

computing uncompressed overcoat values if the first segment is not a solid segment; and compressing the overcoat values.

13. The article of manufacture of claim 12 wherein the overcoat values are computed by:

averaging of the C, M, Y, K values of the input pel(s) corresponding to an output; and retrieving a value from a lookup table using the average values.

14. The article of manufacture of claim 12 comprising a computer-readable medium including instructions, which when executed by the processor further performs generating compressed data for the segment if the segment is solid.

\* \* \* \* \*